United States Patent
Trago

[19]

[11] Patent Number: 6,057,613
[45] Date of Patent: May 2, 2000

[54] HYBRID STEPPER MOTOR HAVING OPTIMIZED TORQUE DENSITY

[75] Inventor: Bradley Trago, Rockford, Ill.

[73] Assignee: Pacific Scientific Company, Rockford, Ill.

[21] Appl. No.: 09/018,488

[22] Filed: Feb. 4, 1998

[51] Int. Cl.[7] .......................... H02K 37/00; H02K 37/10; H02K 37/14
[52] U.S. Cl. .......................... 310/49 R; 310/261
[58] Field of Search .................................. 310/49 R, 261, 310/254, 156

[56] References Cited

U.S. PATENT DOCUMENTS

| | | | |
|---|---|---|---|
| 3,777,196 | 12/1973 | Field, II | 310/49 R |
| 3,956,650 | 5/1976 | Field, II | 310/49 R |
| 4,045,696 | 8/1977 | Lutz et al. | 310/49 R |
| 4,262,353 | 4/1981 | Okazaki et al. | 368/157 |
| 4,347,457 | 8/1982 | Sakamoto | 310/256 |
| 4,406,958 | 9/1983 | Palermo et al. | 310/49 R |
| 4,831,301 | 5/1989 | Neumann | 310/216 |
| 5,283,486 | 2/1994 | Korori | 310/49 |

OTHER PUBLICATIONS

Static torque production in saturated doubly–salient machines, M.R. Harris, Oct. 1975, Proceedings Of The Institution Of Electrical Engineers.

Primary Examiner—Clayton LaBalle
Attorney, Agent, or Firm—Leydig, Voit & Mayer, Ltd.

[57] ABSTRACT

A hybrid stepper motor having optimized torque per unit volume or "torque density" comprises a stator having an outer diameter and an inner diameter, and a rotor rotatably position within the stator inner diameter and being drivably coupled to a shaft. The rotor is of the permanent magnet type having at least one permanent magnet positioned on the shaft, and includes two rotor segments coupled on either end of the permanent magnet. The rotor segments each have a length which is calculated to optimize the torque density of the motor. The calculated optimization of the rotor segment length is accomplished as a function of the stator inner diameter to stator outer diameter ratio. The optimization of the rotor segment lengths allows for a range of values for a given stator inner diameter to outer diameter ratio as defined by a maximum length and a minimum length equation.

23 Claims, 6 Drawing Sheets

HYBRID STEPPER MOTOR HAVING OPTIMIZED TORQUE DENSITY

FIELD OF THE INVENTION

The instant invention relates to hybrid stepper motors, and more particularly to the proper proportioning of motor elements in a two-phase hybrid stepper motor to optimize torque per unit volume (torque density) for such a motor.

BACKGROUND OF THE INVENTION

Machine designers have long known of the necessity of maximizing their designs both in terms of specific output parameters as well as total overall efficiencies. This driving force is especially important in today's competitive environment where excess design cost, weight, and complexity are no longer acceptable. No place has this drive been more universally accepted than in the design and manufacture of hybrid stepper motors.

To reduce cost and weight in the design and manufacture of hybrid stepper motors it is important that no unneeded material be included in the motor design to keep down cost and weight. However, it is also important that enough material be included in the rotor and stator design of these hybrid stepper motors to fully utilize the flux available from the expensive permanent magnets which are integral to the design of these machines.

In the past, some hybrid stepper motor designers focused on maximization of single output parameters in an attempt to produce a superior motor. However, the focus on any one single output parameter neglects overall motor design, and may sacrifice cost, weight, performance, and efficiency of the total design. One such attempt at single output parameter maximization is illustrated in U.S. Pat. No. 5,283,486 issued to Kobori for a STEPPING MOTOR.

In the Kobori '486 patent the single output parameter which is attempted to be maximized is the output torque of the motor. However, focusing solely on output torque neglects the more important machine parameter of overall torque density of the motor. While "torque" is a single output parameter of the motor, "torque density" is a measure of overall motor design efficiency which takes into consideration the torque per unit volume of the motor. The single parameter optimization of Kobori '486 neglects the three dimensional nature of the magnetic circuit of a hybrid stepper motor, and therefore, cannot optimize the overall machine design. In its attempt to maximize the single parameter of output torque, Kobori '486 specifies that a ratio of the stator inside diameter to the stator outside diameter must be kept within a range of 0.62 to 0.64 for a two-phase hybrid stepper motor. However, specifying only the ratio between the stator inside diameter to the stator outside diameter in the design of the hybrid stepper motor wholly ignores other design parameters which may greatly impact the overall design.

As an example, the simplistic approach of Kobori '486 ignores rotor segment length as an important design parameter. Utilizing a rotor segment length which is too short will tend to under-utilize the expensive rotor magnet causing a loss in torque and torque density of the machine. On the other hand, making the rotor segment length too long will increase the inertia of the rotor with no additional benefit in torque, along with a sacrifice in torque density, acceleration capability, and torque at high speed because of increased motor inductance. The cost of taking this simplistic non-three dimensional view to hybrid stepper motor design as suggested by Kobori '486 (maximization of output torque while ignoring overall motor torque density) is, therefore, simply too great in view of the significant impact that other hybrid stepper motor design parameters have on the overall design and performance of these machines. As a result, the quest to maximize the output torque parameter of the stepper motor without considering the three-dimensional nature of the magnetic circuit may in fact result in a design which is unacceptably inefficient, having unneeded material or under-utilizing the expensive permanent magnet of a hybrid stepper motor.

SUMMARY OF THE INVENTION

In view of the foregoing, it is therefore an object of the instant invention to overcome these and other problems with the current state of hybrid stepper motor machine design. More particularly it is an object of the instant invention to provide the proper proportions of the rotor segment length in relation to the stator outside diameter (OD) and stator inside diameter (ID) to optimize (maximize) the torque per unit volume of a hybrid stepper motor, or "torque density". It is a further object of the instant invention to provide the proper proportions over a range of hybrid stepper motor sizes. It is an additional object of the instant invention to develop a motor configuration having optimized torque density without sacrificing the important consideration of torque to inertia ratio for the machine.

In accordance with these and other objects of the invention, it is a feature of the instant invention to provide a motor configuration having a design region defining the relationship between rotor segment length and stator inside diameter to stator outside diameter ratio for optimum torque density. It is a further feature of the invention that this relationship between rotor segment length and stator inside diameter to stator outside diameter ratio for optimum torque density is applicable over a range of hybrid stepper motor design perimeters such as stator pole tooth to pitch ratios, type and saturation levels of electrical laminations used in the magnetic circuit, type and strength of permanent magnet materials used, stator yoke thickness to stator pole thickness, shaft body diameters, magnet thickness, and radial air gap distance. It is a further feature of the instant invention to provide a hybrid stepper motor whose torque density has been maximized through the defined relationships.

To accomplish the above and other objectives, and in accordance with the above and other features, a method of optimizing the torque density of a hybrid stepper motor is provided comprising the steps of selecting the outer diameter and inner diameter of the stator, and calculating a length of the rotor segments as a ratio of the inside diameter of the stator to the outside diameter of the stator to maximize the torque density of the hybrid stepper motor. Preferably, the step of calculating the length of the rotor segments comprises the steps of calculating the maximum length of the rotor segment as a function of a ratio of the inside diameter of the stator to the outside diameter of the stator, calculating a minimum length of the rotor segments as a function of the ratio of the inside diameter of the stator to the outside diameter of the stator, and selecting the length of the rotor segments within the maximum length and minimum length calculated above.

In accordance with the above, a hybrid stepper motor is provided comprising a stator having an outer diameter and an inner diameter, and a rotor rotationally positioned within the inner diameter of the stator. The rotor is of the permanent magnet type and is drivably coupled to a shaft. The rotor includes at least one disc shaped permanent magnet positioned on this shaft and two rotor segments positioned on either axial end of the magnet. The length of these rotor segments is calculated to optimize the torque density of the motor. This optimization calculation is a function of the stator inner diameter to outer diameter ratio and defines a range for a given ratio from which an optimized rotor segment length may be selected. In a preferred embodiment of the instant invention the function relates the rotor segment length to the stator outer diameter and to a ratio of the stator inner diameter to outer diameter to maximize the torque density in the motor.

These and other aims, objectives, advantages, and features of the invention will become more apparent from the following detailed description while taken into conjunction with the accompanying drawings.

While the invention is susceptible to various modifications and alternative constructions, certain illustrative embodiments thereof have been shown in the drawings and will be described below in detail. It should be understood, however, that there is no intention to limit the invention to the specific forms disclosed, but on the contrary, the invention is to cover all modifications, alternative constructions and equivalence falling within the spirit and scope of the invention as defined by the appended claims.

DETAILED DESCRIPTION OF THE PREFERRED EMBODIMENT

Figure 1:
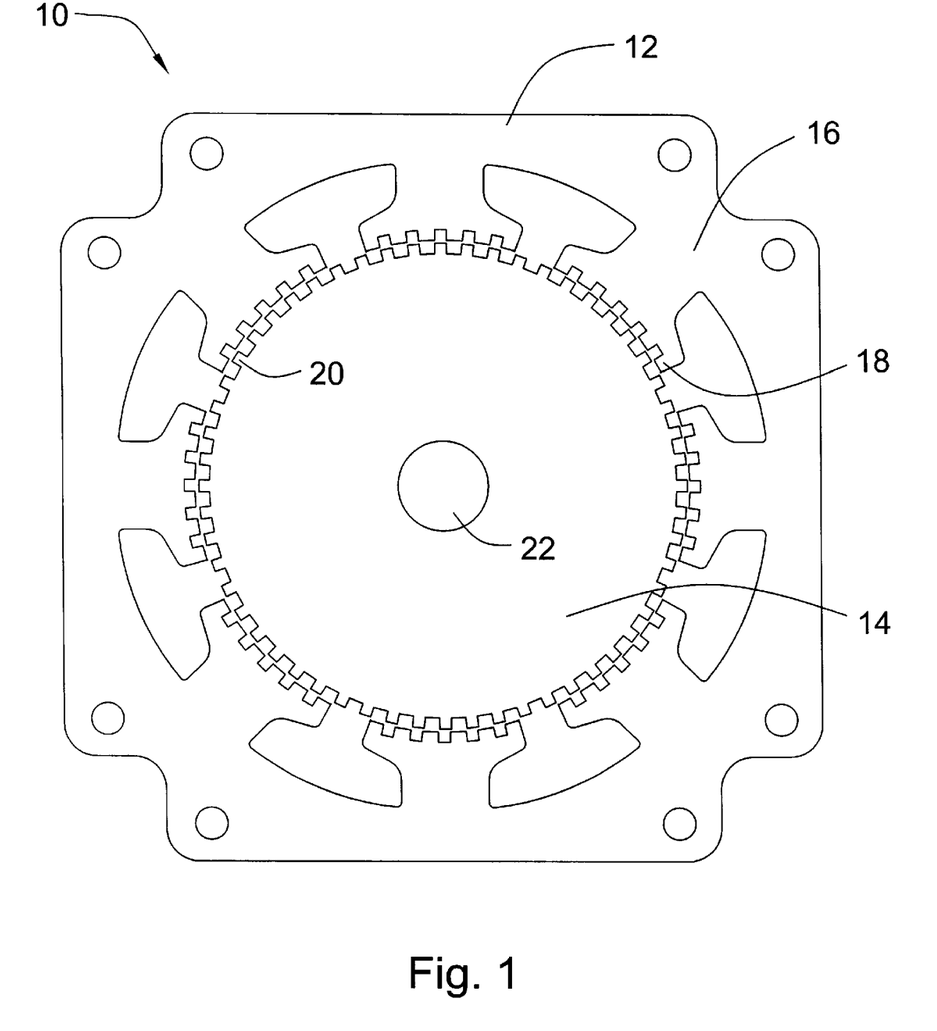
FIG. 1 is a cross sectional diagram of a two-phase hybrid stepper motor constructed in accordance with the teachings of the instant invention.

A preferred embodiment of a hybrid stepper motor 10 is illustrated in FIG. 1. As may be seen from this cross-sectional view, the hybrid stepper motor 10 comprises a stator 12 and a rotor 14. The stator 12 has a plurality of stator poles 16 projecting inwardly from the yoke of the stator 12. Each of the stator poles 16 includes a plurality of stator pole teeth 18 defining an inner diameter of the stator 12. The rotor 14 also includes a plurality of rotor teeth 20. The rotor is coupled by shaft 22 to a mechanical load (not shown) which it drives. While the invention is not limited thereto, preferably the rotor 14 is of a hollow construction having excessive material removed from the rotor segment 14. Removal of this excess material improves the motor acceleration capability by reducing rotor inertia.

Figure 2:
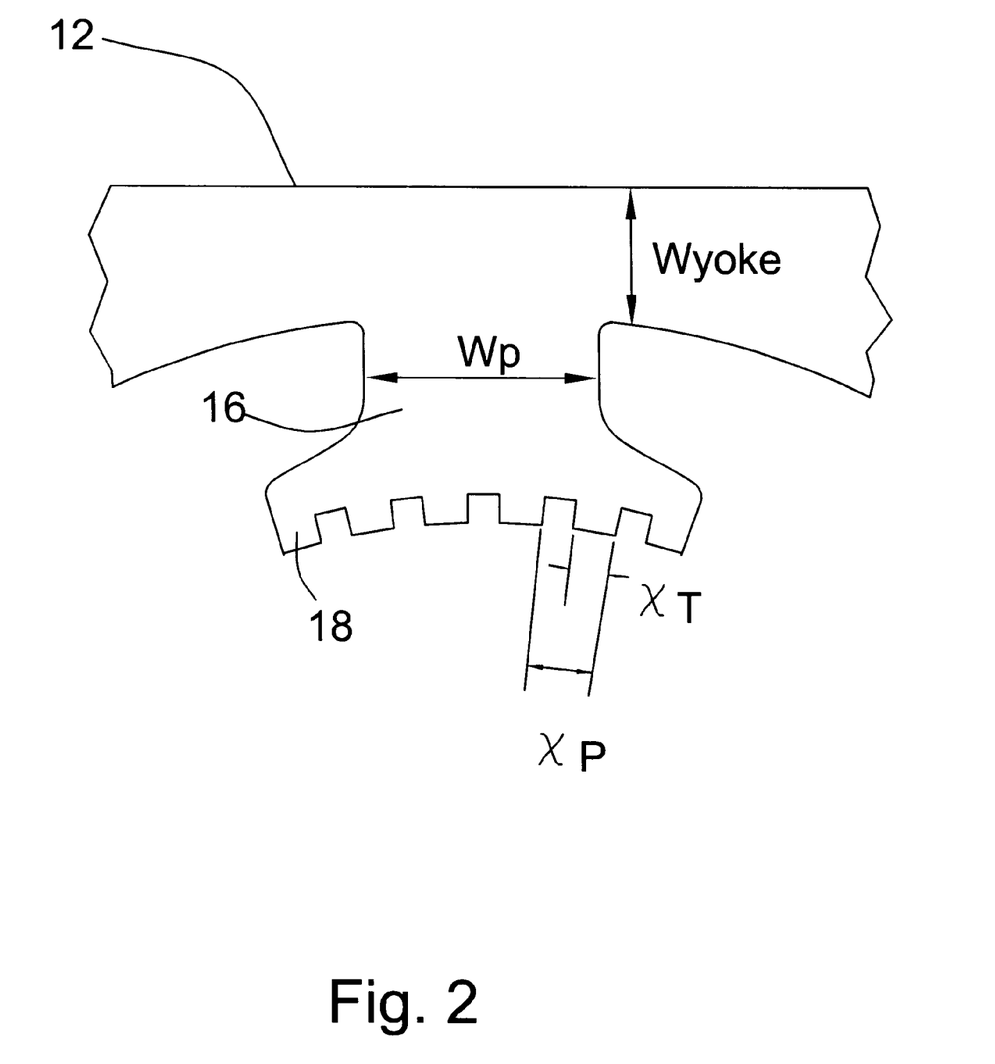
FIG. 2 is a partial cross sectional view of a stator pole illustrating certain hybrid stepper motor design parameters.
Figure 3:
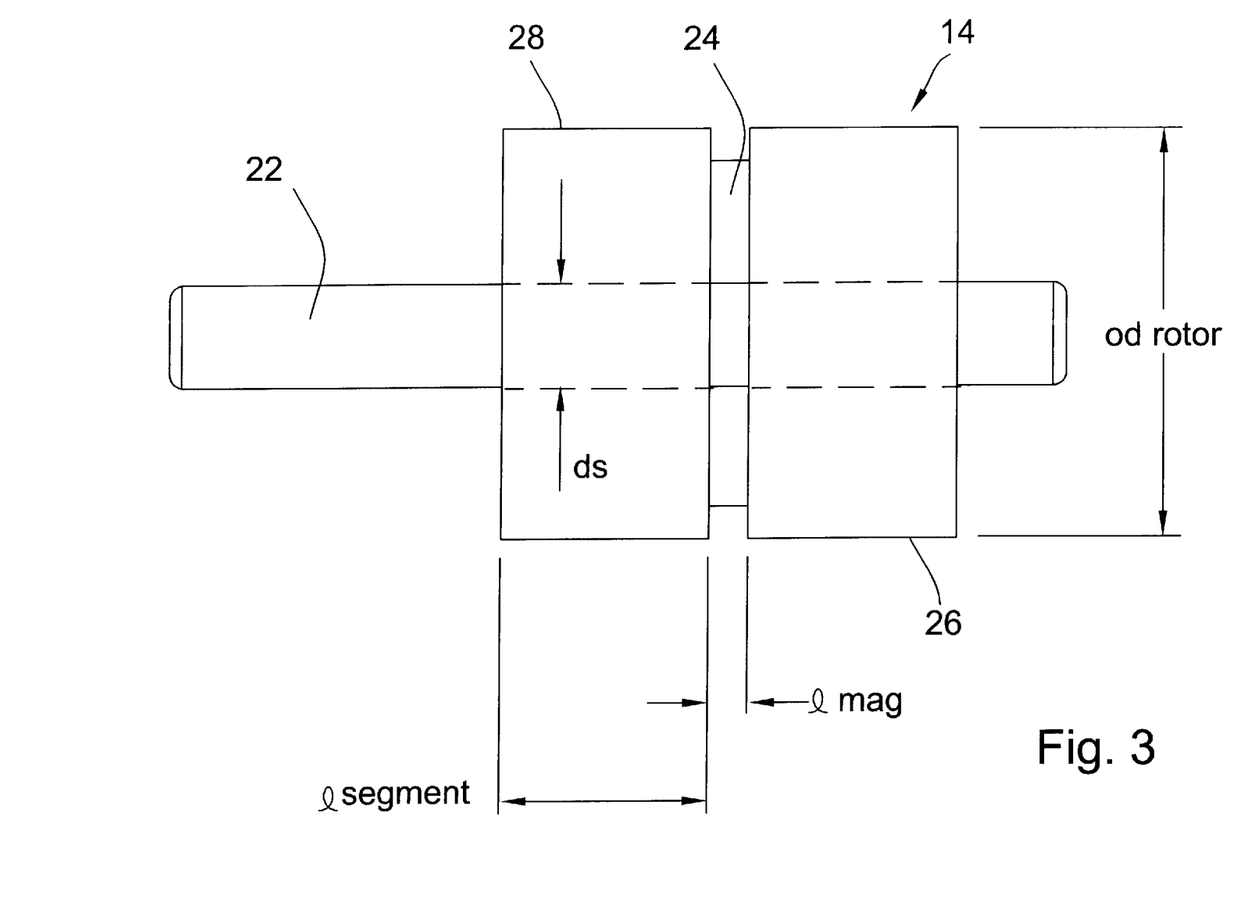
FIG. 3 is a sectional view of a hybrid stepper motor rotor assembly illustrating certain design parameters for the hybrid stepper motor.
Figure 4:
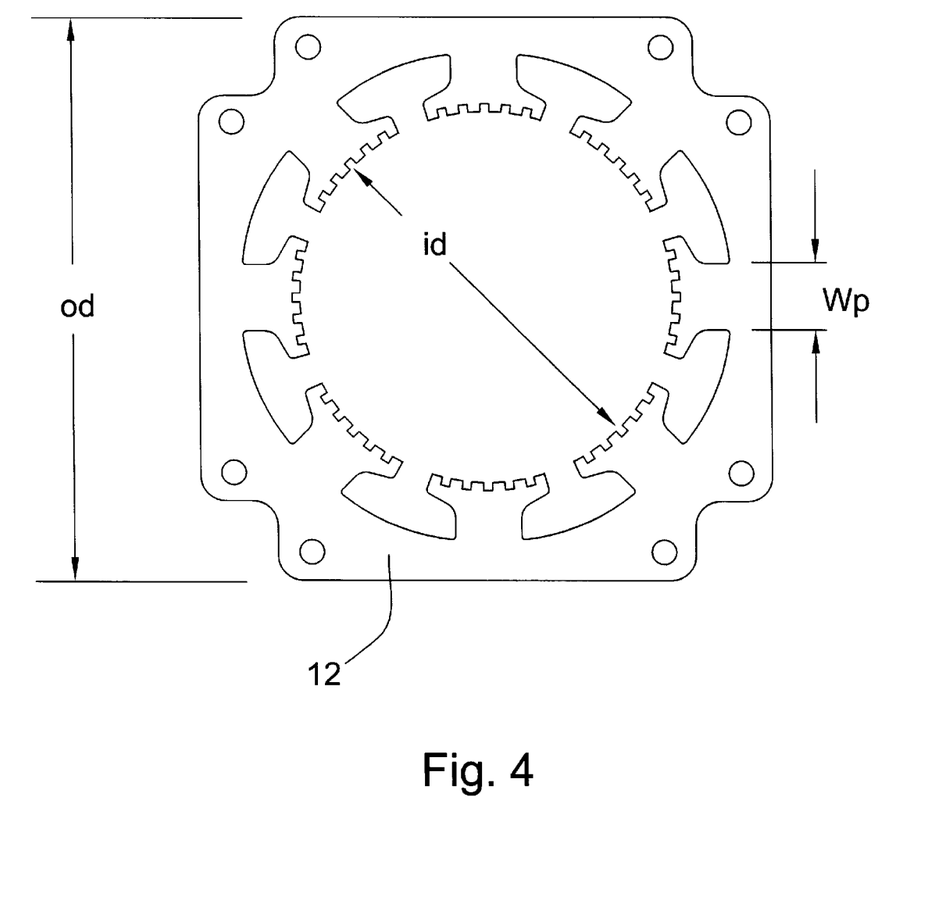
FIG. 4 is a cross sectional view of a stator lamination for a hybrid stepper motor illustrating certain design parameters.

Optimization of the torque density of the hybrid stepper motor of FIG. 1 is a complex problem involving many variables. This complexity arises in part due to the three-dimensional nature of the magnetic circuit of the hybrid stepper motor. FIGS. 2–4 illustrate many of the variables which must be considered in the optimization of the hybrid stepper motor of FIG. 1. With specific reference now to FIG. 2 a portion of the stator 12 is shown illustrating a single stator pole 16 having a plurality of stator pole teeth 18. Identified in FIG. 2 are the parameters of the stator yoke thickness ($W_{yoke}$), the stator pole thickness ($W_p$), the tooth thickness ($\chi_t$), and the tooth pitch ($\chi_p$) Illustrated in FIG. 3 is the shaft body diameter ($d_s$), the rotor segment length ($l_{segment}$) and the magnet thickness ($l_{mag}$)

As may be seen from FIG. 3 the rotor 14 is constructed with a disc shaped permanent magnet 24 secured to the shaft 22. Two rotor segments 26 and 28 are positioned beside either axial end of the magnet 24, and have rotor teeth which are typically offset one from another by 180° in electrical phase angle. The rotor segments 26, 28 may provide some overlap (not shown) on the magnet 24 to provide additional support for the magnet 24 as is desired. Additionally, the rotor segments 26, 28 may be hollowed to remove weight and reduce inertia from the rotor if needed or desired.

The permanent magnet 24 is typically magnetized in an axial direction of the shaft 22 which, in turn, magnetizes the rotor segments 26 and 28 into a north and south pole. The lines of magnetic flux (not shown) travel from one pole of the magnet 24 through one of the rotor segments 26, across the air gap between the rotor and stator poles (see FIG. 1), through the stator pole, back across the air gap to the other rotor segment 28, and through that segment 28 to the other pole of the magnet 24. As the length of the rotor segments 26, 28 is increased, there is reached a point when additional length no longer efficiently or productively aids the flow and coupling of magnetic flux to any significant degree. Lengths beyond this point simply add weight to the motor and detract from its performance as described above. Likewise, as the length of the rotor segments 26, 28 is shortened, at some point the lines of flux become "crowded" in the short segments causing magnetic saturation, and no longer providing efficient coupling across the air gap to the stator poles. As a result, the strength of the permanent magnet 24 is wasted as described above.

FIG. 4 illustrates the parameters of inside A diameter and outside diameter for the stator 12. It should be noted at this point that while the exemplary embodiments of the invention illustrated in the figures are square or "housing-less" motors, the invention equally may be configured in a round motor or in a motor where magnetic steel housings are fitted over the outside diameter (OD) of the stator. The proportions disclosed herein resulting in an optimization of the torque density of the hybrid stepper motor applies for these other non-illustrated embodiments as well, and are considered to be within the scope of the invention as defined by the appended claims.

With references again to FIGS. 2–4 as appropriate, the optimization of the torque density for the hybrid stepper motor is, as stated above, a complex process involving many variables affecting the three-dimensional magnetic circuit of the hybrid stepper motor. Through the performance of scalar analysis on these variables, a set of parameter rules useful in properly sizing the rotor segment length, and thus optimizing the torque density, can be developed. This scalar analysis examines the equations governing the operation of a hybrid stepper motor, and sets out to simplify these equations by examining the relative magnitude of the terms, discarding them if variance has insignificant impact on the solution of the problem. In a similar way, a numerical analysis may be used. Through this analysis it has been found that designing certain parameters of the hybrid stepper motor within given ranges allows for optimization of the torque density of the machine. Specifically, the tooth to pitch ratio (also commonly referred to as the tooth to valley ratio, TVR) which is defined as $\chi_t/\chi_p$, should be maintained between 0.38 and 0.45, and preferably at 0.42. The stator should be constructed from practical non-oriented electrical laminations with saturation levels of 18–21 Kgauss. The rotor magnets 24 are of rare earth or other material with Br values of 10–12.5 Kgauss. The optimized hybrid stepper motor of the instant invention also maintains a stator yoke thickness of 45% to 75% of the stator pole thickness. The body diameter of the shaft 22 is preferably only 10–25% of the outside diameter of the stator. In the preferred embodiment of the instant invention the magnet thickness ($1_{mag}$) may range from 1.5% to 7% of the motor outside diameter. Preferably, the radial air gap between the rotor outside diameter and stator insider diameter is 0.001–0.005 inches with the stator outside diameter ranging from 25 mm–165 mm.

Figure 5:
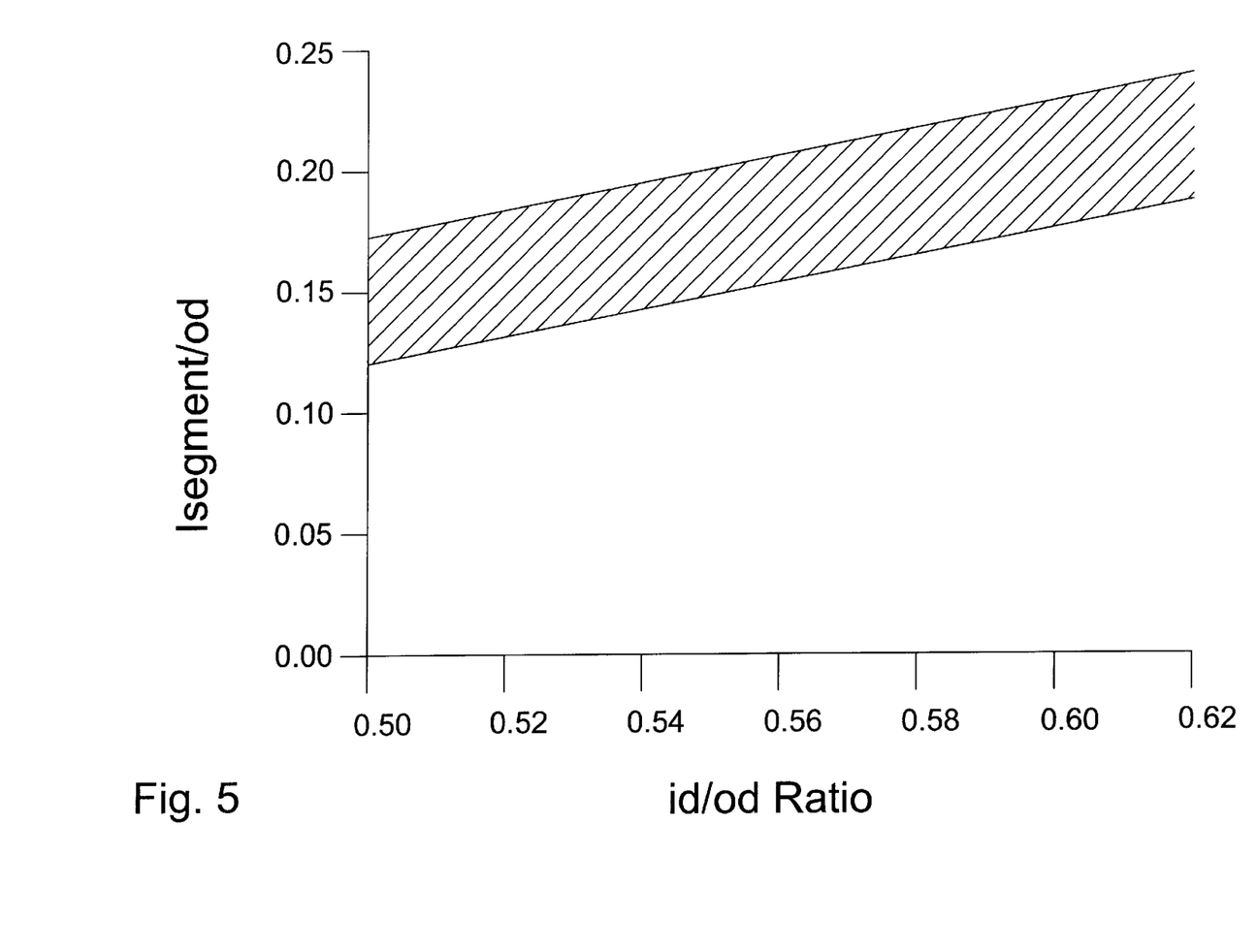
FIG. 5 is a graphical plot illustrating the design region defining the relationship between the rotor segment length and stator inside diameter to stator outside diameter ratio for optimum torque density in accordance with the instant invention.

With these design parameters defined as described above, and with reference now to FIG. 5, a region of the stator inside diameter to the stator outside diameter versus the rotor segment length to the stator outside diameter may be determined which allows the optimization of the torque density of the hybrid stepper motor. The design of the hybrid stepper motor, in accordance with a preferred embodiment of the instant invention, maintains this relationship to optimize the torque density of the machine, thus avoiding the under utilization of the expensive rotor magnets and needless loss in torque and torque density which results from the use of rotor segments which are too short, as well as avoiding the increase of inertia of the rotor, the sacrifice of torque density, acceleration capability and torque at high speed due to increased motor inductance which results from the use of rotor segments which are too long. This optimal torque density design region, as may seen from FIG. 5, requires that the hybrid stepper motor have rotor segments of a length such that their length to stator outside diameter ratio is maintained within a range defined by an upper bound equation:

$$\frac{l_{segment}}{od} = 0.583\left(\frac{id}{od}\right) - 0.1215$$

and a lower bound equation:

$$\frac{l_{segment}}{od} = 0.533\left(\frac{id}{od}\right) - 0.1485$$

These equations have a preferred practical interest for a range of id/od values from approximately 0.45 to approximately 0.62, although their application is not solely limited thereto.

Figure 6:
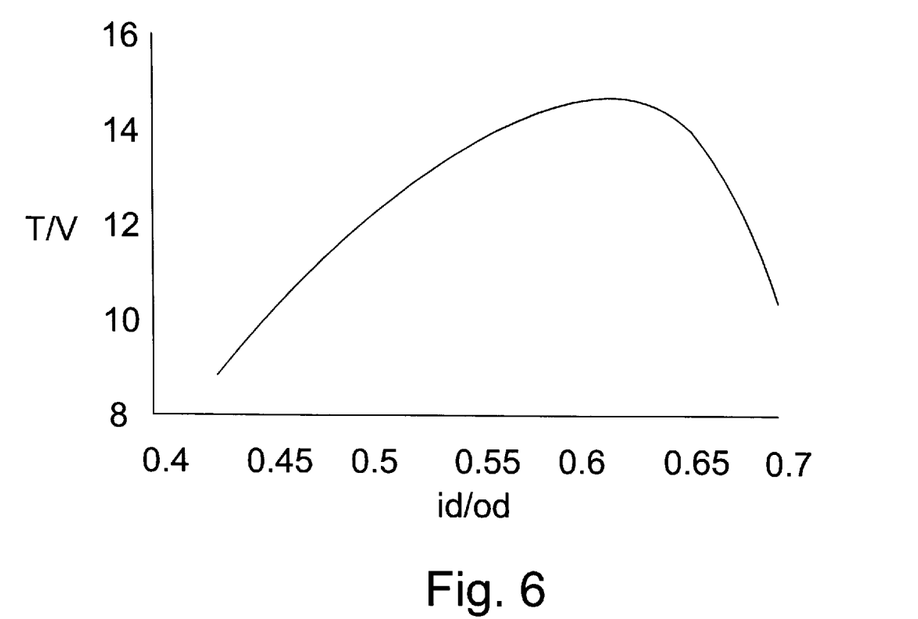
FIG. 6 is a graphical representation illustrating the torque density versus stator inside diameter to stator outside diameter ratio for the optimized hybrid stepper motor of the instant invention.

FIG. 6 illustrates a plot of torque density versus stator inside diameter to outside diameter ratio for an exemplary motor which has the rotor segment length within the prescribed area of FIG. 5 to maximize torque density. As may be apparent from this figure, the torque density reaches a maximum at a hybrid stepper motor size having an inside diameter to outside diameter ratio of approximately 0.61. It is important to note that as the ratio of the stator inside to outside diameters is varied, the rotor segment length may also be required to be varied to maintain its ratio to the stator's outside diameter within the bounded area of FIG. 5. Failure to do so may result in a less than optimized design having a rotor segment length which is either too short or too long. One skilled in the art will recognize that the plot of FIG. 6 is simply an exemplary plot of a particular motor having its rotor segment length optimized in accordance with the teachings of this invention. There will be, in fact, a multitude of curves which will result from the various particular designs which are constructed in accordance with the teachings of the instant invention, and therefore, FIG. 6 is presented by way of illustration, and not by way of limitation.

Figure 7:
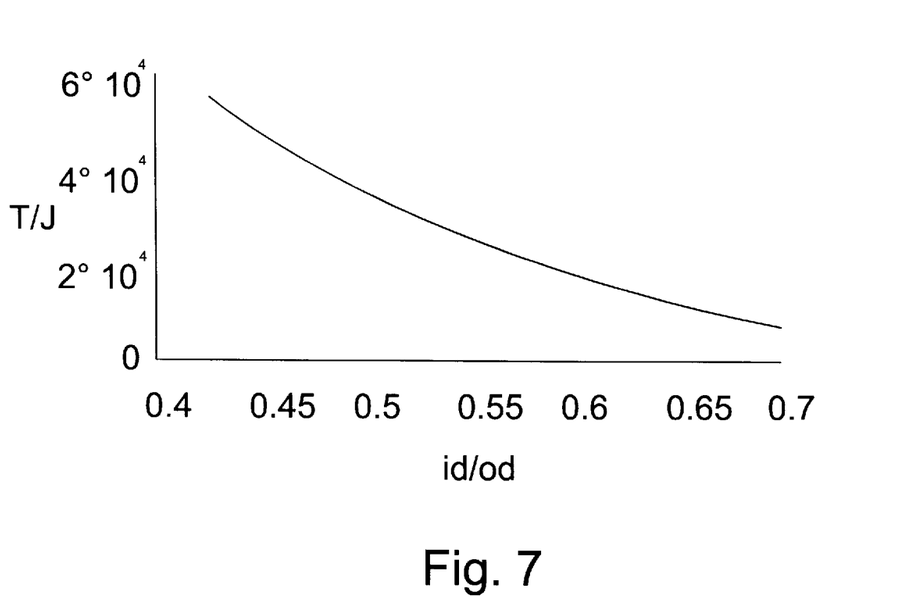
FIG. 7 is a graphical representation illustrating the torque to inertia ratio versus stator inside diameter to stator outside diameter ratio for the optimized hybrid stepper motor of the instant invention.

FIG. 7 illustrates a plot of the torque-to-inertia ratio versus the hybrid stepper motor inside-to-outside diameter ratio, which is another important measure of the optimized hybrid stepper motor, for an exemplary motor constructed in accordance with the teachings of the instant invention. This graph plots the figure of merit which is directly related to how quickly a hybrid stepper motor can accelerate without load. Maximum torque to inertia ratio occurs at stator inside to outside diameter ratios that are very small because inertia varies in proportion to the fourth power of the rotor diameter. As may be seen, small stator inside to outside diameter ratios may be needed where it is important to have a high torque-to-inertia ratio. The motor designer then must refer to the bounded region of FIG. 5 to optimize the torque density of the machine.

To construct a hybrid stepper motor in accordance with the teachings of the instant invention, therefore, a designer would first select an outside diameter for the machine. This selection is often based simply on the packaging requirements for the particular application into which the stepper motor is being placed. Once the motor outside diameter is selected, the stator inside diameter is selected or calculated to optimize torque or torque/inertia in accordance with methods known in the art depending on the requirements of the particular application. Once both the inside diameter and the outside diameter have been defined, the ratio of the two is calculated. From this information, the length of the rotor segments are calculated in accordance with the above teachings of the instant invention.

To illustrate the significant advantage achieved by designing the hybrid stepper motor in accordance with the teachings of the instant invention, a typical NEMA34 hybrid stepper motor available on the market was compared with a NEMA34 hybrid stepper motor constructed in accordance with the teachings of the instant invention and sold by the assignee of the instant invention under the trademark PowerPac®. The typical hybrid stepper motor was constructed in accordance with the teachings of the Kobori '486 patent having a ratio of the stator inside diameter to the stator outside diameter within the range of 0.62 to 0.64 selected to optimize torque, but not having a motor segment length which has been optimized in accordance with the teaching of the instant invention. The testing of these two machines revealed that the PowerPac® hybrid stepper motor produced approximately 13% more torque per unit volume (torque density) and 45% more torque than the typical hybrid stepper motor constructed in accordance with the Kobori '486 patent. While the PowerPac® motor is 28% longer than the typical hybrid stepper motor, part of this additional length results from the use of longer endbells than the typical hybrid stepper motor due to the use of larger bearings. When this is taken into account, using the same endbell design as the typical hybrid stepper motor for a better comparison, the PowerPac® hybrid stepper motor constructed in accordance with the teachings of the instant invention is seen to produce 21% more torque per unit volume and 45% more torque while being only 20% longer. While the torque per unit volume increase was as expected from the maximization techniques taught by the instant invention, the substantial increase and torque output was clearly unexpected and quite extraordinary. The Kobori '486 patent claims an inside diameter to outside diameter ratio which purportedly optimizes the output torque available from a hybrid stepper motor. However, since this patent also secures the rights to this so called optimized range, the PowerPace® hybrid stepper motor could not utilize what was taught in Kobori '486 as the optimized range for the ratio of the stator inside diameter to the stator outside diameter. Even so, the design of a hybrid stepper motor in accordance with the teachings of the instant invention resulted in the production of approximately 45% more torque than a hybrid stepper motor produced with the Kobori '486 optimized ratio. This fact not only results in a hybrid stepper motor which has optimized efficiency of torque per unit volume (torque density), but also allows use of this one-stack hybrid stepper motor in applications heretofore requiring a two-stack hybrid motor, greatly reducing the size and weight of these applications.

Numerous modifications and alternative embodiments of the invention will be apparent to those skilled in the art in view of the foregoing description. Accordingly, this description is to be construed as illustrative only and is for the purpose of teaching those skilled in the art the best mode for carrying out the invention. The details of the structure may be varied substantially without departing from the spirit of the invention, and exclusive use of all modifications that come within the scope of the appended claims is reserved.

What is claimed is:

1. A method of optimizing torque density of a hybrid stepper motor having a stator and a rotor, the rotor having at least one permanent magnet and a first and a second rotor segment positioned on either end thereof, the method comprising the steps of:
    selecting an outside diameter of the stator;
    calculating an inside diameter of the stator as a ratio to the outside diameter of the stator;
    calculating a length of the rotor segments to maximize a torque density of the hybrid stepper motor.

2. The method of claim 1, wherein said step of calculating a length of the rotor segments comprises the steps of:
    calculating a maximum length of the rotor segments as a function of a ratio of the inside diameter of the stator to the outside diameter of the stator;
    calculating a minimum length of the rotor segments as a function of the ratio of the inside diameter of the stator to the outside diameter of the stator; and
    selecting the length of the rotor segments within the maximum length and minimum length.

3. A method of optimizing torque density of a hybrid stepper motor having a stator and a rotor, the rotor having at least one disc shaped permanent magnet and rotor segments positioned on either end thereof, the method comprising the steps of:
    selecting an outside diameter of the stator;
    selecting an inside diameter of the stator;
    calculating a length of the rotor segments as a ratio of the inside diameter of the stator to the outside diameter of the stator to maximize a torque density of the hybrid stepper motor.

4. The method of claim 3, wherein said step of calculating a length of the rotor segments comprises the steps of:
    calculating a maximum length of the rotor segments as a function of a ratio of the inside diameter of the stator to the outside diameter of the stator;
    calculating a minimum length of the rotor segments as a function of the ratio of the inside diameter of the stator to the outside diameter of the stator; and
    selecting the length of the rotor segments within the maximum length and minimum length.

5. A hybrid stepper motor, comprising:
    a stator having an outer diameter and an inner diameter;
    a rotor rotatably positioned within said stator inner diameter, said rotor being drivably coupled to a shaft and including at least one permanent magnet positioned on said shaft, said rotor further including a first and a second rotor segment, each of said first and said second rotor segments positioned in magnetic communication with an axial end of said permanent magnet; and
    wherein a length of said first and said second rotor segments is predetermined to maximize torque density of the motor.

6. The motor of claim 5, wherein said length of said first and said second rotor segments is a function of a ratio of said stator inner diameter to said stator outer diameter.

7. The motor of claim 6, wherein said function relates said rotor segment length to said stator outer diameter and to a ratio of said stator inner diameter to said stator outer diameter to maximize torque density in the motor.

8. The motor of claim 7, wherein said length of said first and said second rotor segment divided by said stator outer diameter does not exceed $$\frac{l_{segment}}{od} = 0.583\left(\frac{id}{od}\right) - 0.1215.$$

9. The motor of claim 7, wherein said length of said first and said second rotor segment divided by said stator outer diameter exceeds $$\frac{l_{segment}}{od} = 0.533\left(\frac{id}{od}\right) - 0.1485.$$

10. The motor of claim 7, wherein said length of said first and said second rotor segment divided by said stator outer diameter is within the range defined by $$\frac{l_{segment}}{od} = 0.583\left(\frac{id}{od}\right) - 0.1215 \text{ and } \frac{l_{segment}}{od} = 0.533\left(\frac{id}{od}\right) - 0.1485.$$

11. The motor of claim 6, wherein said stator includes a plurality of stator poles, each of said stator poles having a plurality of stator pole teeth of a given pitch, and wherein a tooth to pitch ratio is between 0.38 and 0.45.

12. The motor of claim 11, wherein said tooth to pitch ratio is approximately 0.42.

13. The motor of claim 6, wherein said stator includes a yoke and a plurality of stator poles having a designed thickness, and wherein a thickness of said stator yoke is in the range of 45% to 75% of said stator pole thickness.

14. The motor of claim 6, wherein a diameter of said shaft is in the range of 10% to 25% of said stator outside diameter.

15. The motor of claim 6, wherein said permanent magnet has a designed thickness, and wherein said thickness is in the range of 1.5% to 7% of said stator outside diameter.

16. The motor of claim 6, wherein a distance between said inside diameter of said stator and an outside diameter of said rotor is in the range of 0.001 to 0.005 inches.

17. The motor of claim 6, wherein said outside diameter of said stator is in the range of 25 mm to 165 mm.

18. A two-phase hybrid stepper motor, comprising:
a wound stator having an outer and an inner diameter;
a permanent magnet rotor rotationally positioned within said inner diameter of said stator, said rotor including a first and a second rotor segment positioned on either end of said permanent magnet rotor, a length of said first and said second rotor segments calculated to maximize torque density of the hybrid stepper motor.

19. The motor of claim 18, wherein said length is calculated as a function of a ratio of said stator inner diameter and said stator outer diameter.

20. The motor of claim 19, wherein said function relates a ratio of said length and said stator outer diameter to said ratio of said stator inner diameter and said stator outer diameter.

21. The motor of claim 20, wherein said length is selected from a range of lengths bounded by a maximum length function and a minimum length function.

22. The motor of claim 21, wherein said maximum length function is defined by $$\frac{l_{segment}}{od} = 0.583\left(\frac{id}{od}\right) - 0.1215.$$

23. The motor of claim 21, wherein said minimum length function is defined by $$\frac{l_{segment}}{od} = 0.533\left(\frac{id}{od}\right) - 0.1485.$$

* * * * *